June 14, 1966 G. B. DOREY 3,255,714
HOPPER GATE DISCHARGE ASSEMBLY WITH SEALING GASKET
Filed Dec. 3, 1962 5 Sheets-Sheet 1
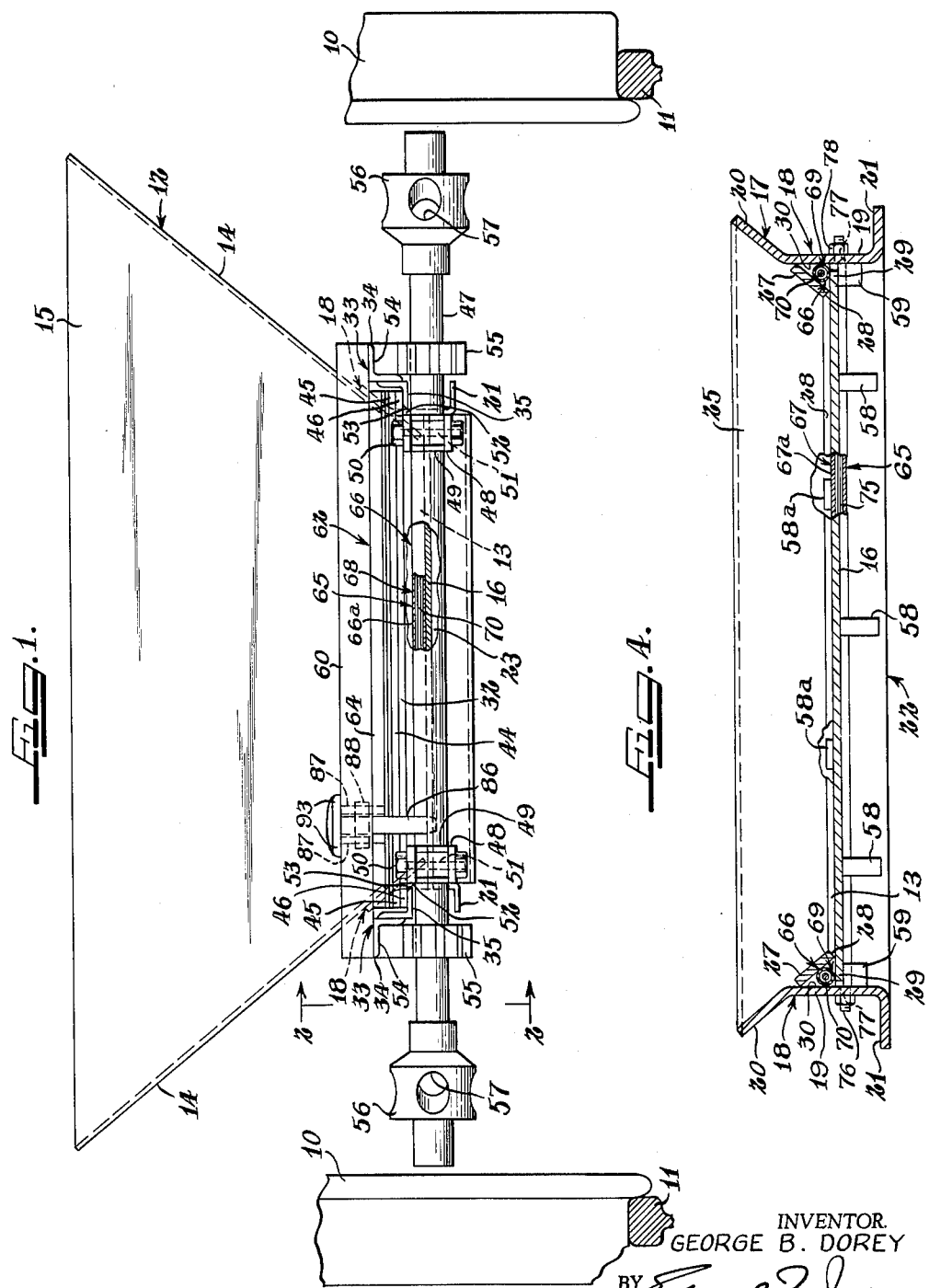
INVENTOR.
GEORGE B. DOREY
BY Edward T. Jurow
Atty June 14, 1966  G. B. DOREY  3,255,714
HOPPER GATE DISCHARGE ASSEMBLY WITH SEALING GASKET
Filed Dec. 3, 1962  5 Sheets-Sheet 2
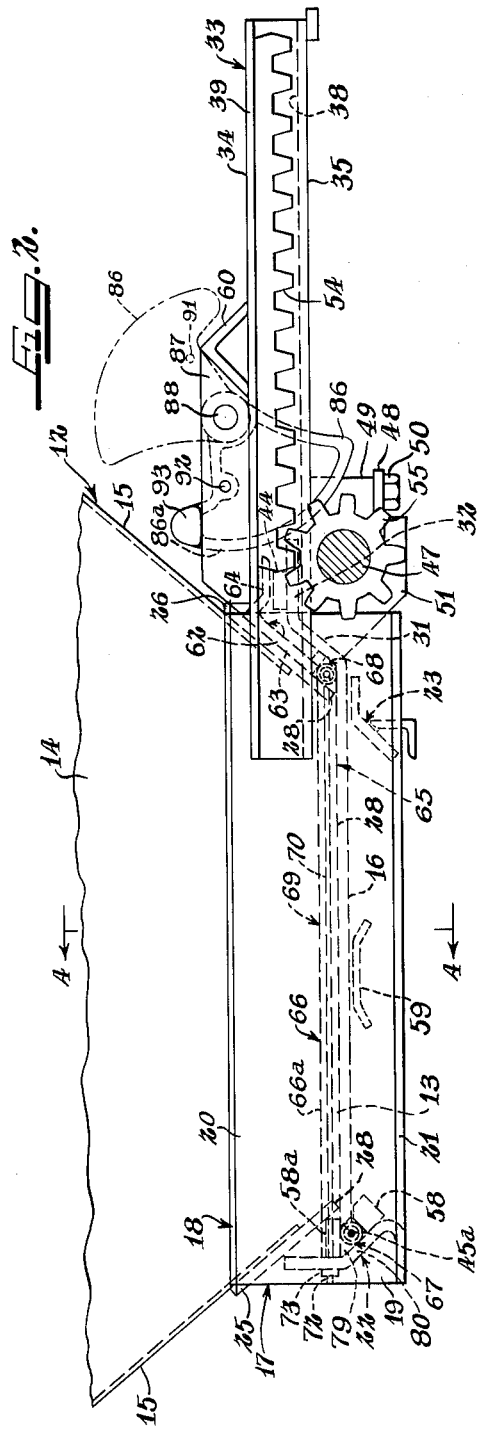
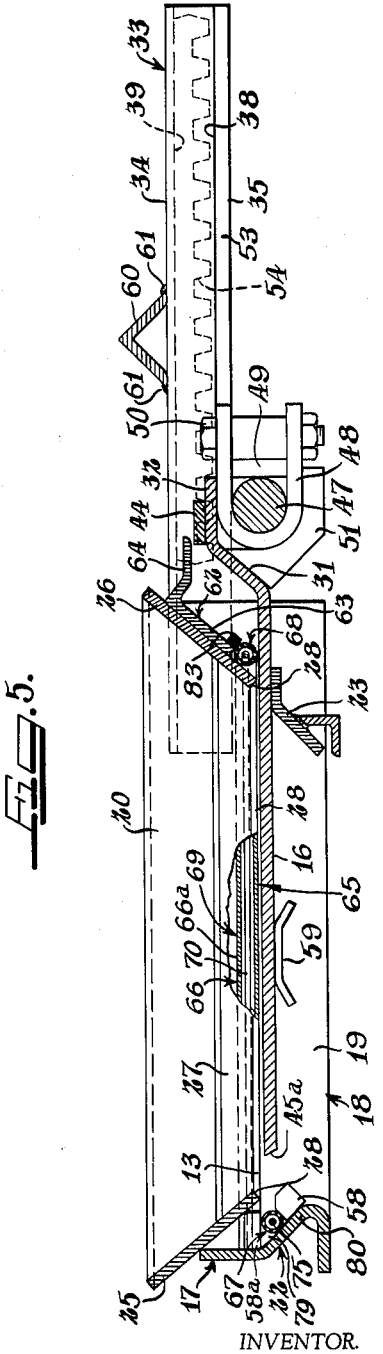
INVENTOR.
GEORGE B. DOREY
BY Edward N. Jurow
Atty.

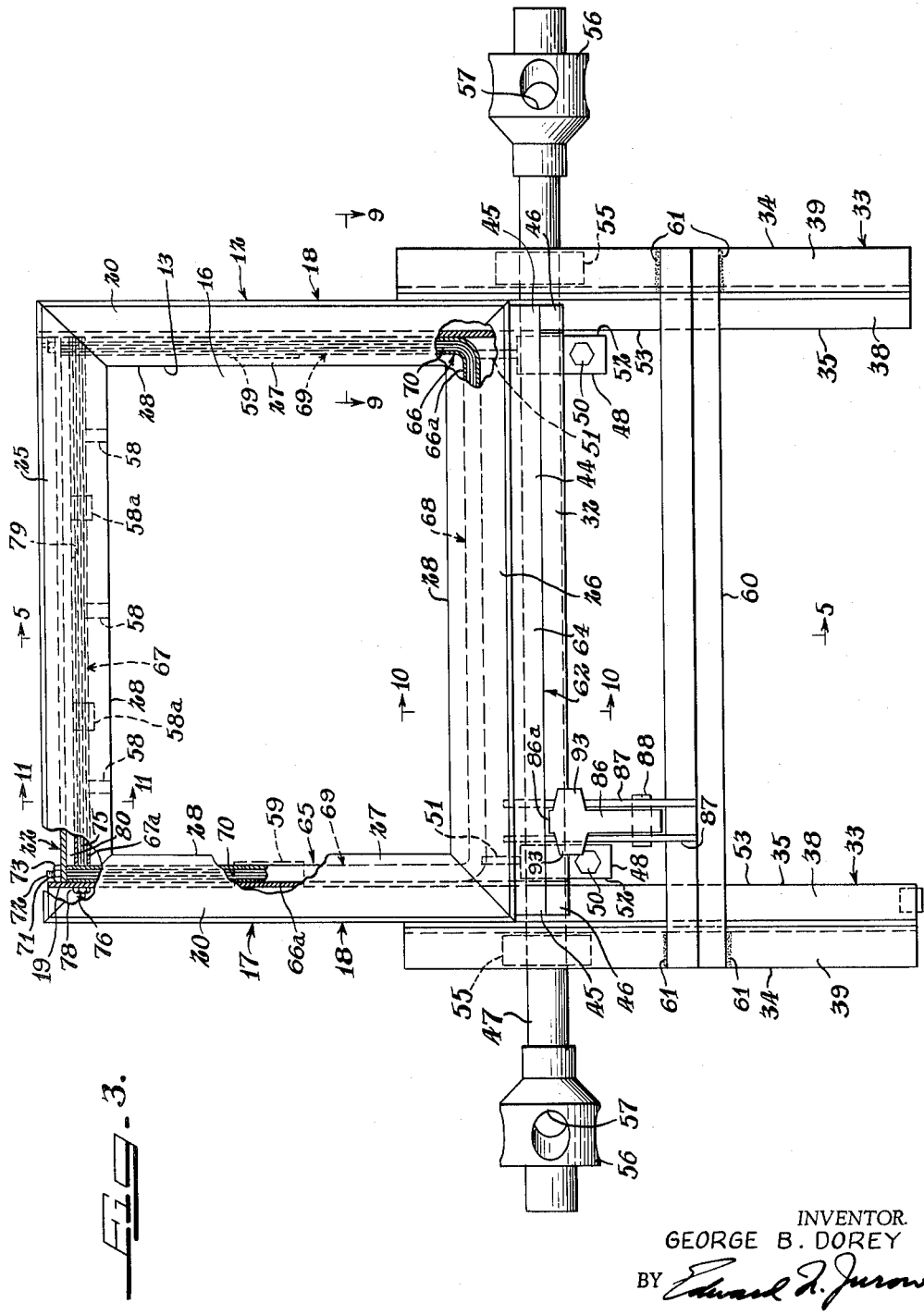

June 14, 1966 G. B. DOREY 3,255,714
HOPPER GATE DISCHARGE ASSEMBLY WITH SEALING GASKET
Filed Dec. 3, 1962 5 Sheets-Sheet 4
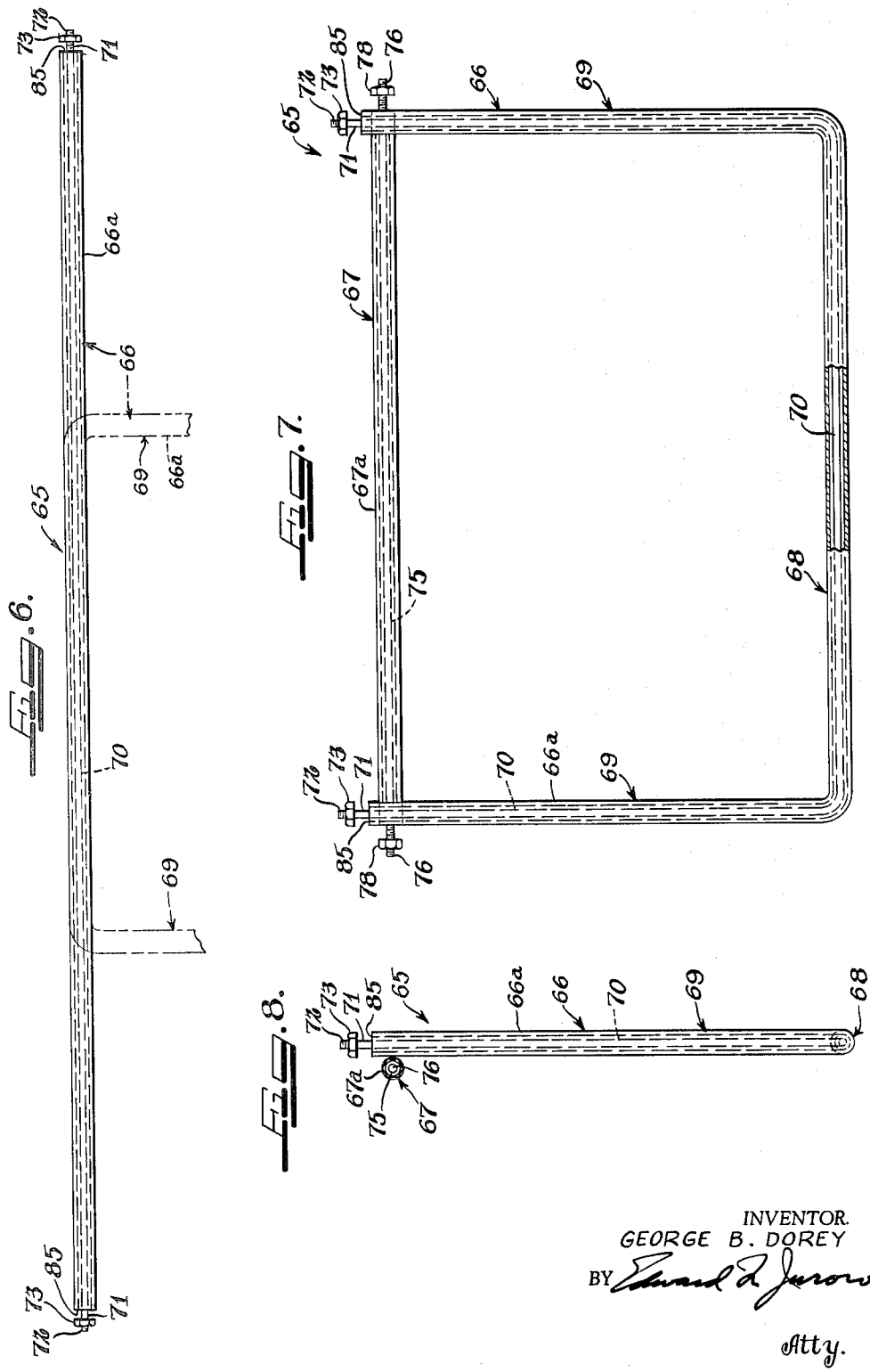
INVENTOR.
GEORGE B. DOREY
BY
Atty.

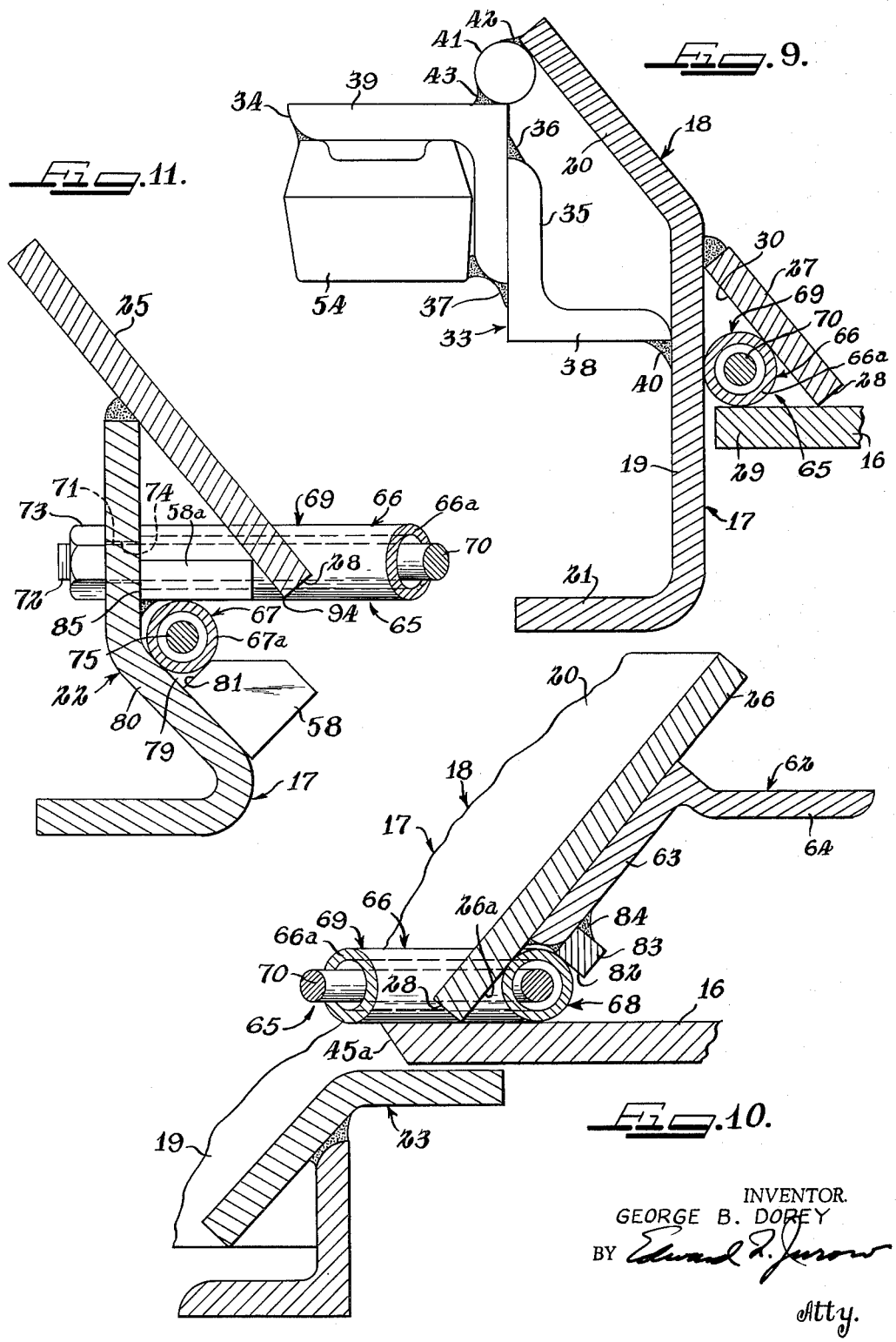

United States Patent Office 3,255,714
Patented June 14, 1966

3,255,714
HOPPER GATE DISCHARGE ASSEMBLY WITH SEALING GASKET
George B. Dorey, Westmount, Quebec, Canada, assignor to Enterprise Railway Equipment Company, Chicago, Ill., a corporation of Illinois
Filed Dec. 3, 1962, Ser. No. 241,746
4 Claims. (Cl. 105—253)

The invention relates to a sealing gasket arrangement for the discharge opening of a hopper such as is incorporated in railway hopper cars and the like for handling finely comminuted lading and lading having a high moisture content such as liquid salt.

The employment of gaskets around the edges of railway car hopper openings has heretofore presented difficulties owing to dislodgement of such gaskets after prolonged use as a result of improper anchoring of same.

The present invention contemplates the employment of a resilient gasket element which extends transversely to and lies in the path of closing movement of a sliding gate and is adapted to be compressed by the leading edge thereof, in combination with other gasket means hugging the upper surface of the gate around the remaining sides of the opening.

The objects of the invention among others are to provide a resilient gasket element with a coaxially extending inner frame element whereby to provide a combination of rigidity and resilience; to provide a three-sided or generally U-shaped gasket element including a transversely extending portion adapted to seat on the upper surface of the gate throughout its entire range of movement and to "sweep" same clean as the gate is opened; to provide intersecting gaskets adapted to intersect in impinging relation; to provide a resilient tubular gasket element with a rigid core which extends therethrough with provision for attachment of the ends of said core to the hopper; and to provide a gasket structure for sealing three sides of the opening by contact with the upper surface of the gate and for sealing the fourth side by contact with the leading edge of the gate.

The invention further resides in the arrangement for automatically locking the gate in its closed position against the gasket as the gate reaches its closed position and in the arrangement of parts and details of construction such as will be hereinafter pointed out.

For further comprehension of the invention reference may be had to the accompanying drawings wherein the improvement is shown as applied to the hopper of a railway car.

In said drawings, FIGURE 1 is a transverse elevational view as taken through the lower portion of a center discharging car and showing only as much of the car as is necessary to illustrate an embodiment of the improvement, said view including a cutaway portion to illustrate the gasket.

FIGURE 2 is a side elevational view of the structure shown in FIGURE 1 as viewed on the line 2—2 of FIGURE 1.

FIGURE 3 is a plan view of FIGURE 2 with the hopper removed and with certain parts of the hopper outlet frame broken away to better illustrate the structure.

FIGURE 4 is a vertical transverse sectional view taken generally on the line 4—4 of FIGURE 2 with the hopper removed.

FIGURE 5 is a longitudinal vertical sectional view taken generally on the line 5—5 of FIGURE 3 and showing the gate in a partially open position with the leading end thereof dropped sufficiently to release the pressure on the U-shaped gasket.

FIGURE 6 is a view showing the U-shaped gasket and frame assembly in full line prior to bending and in broken line after bending.

FIGURE 7 is a top plan view showing the relation of the components of the gasket assembly when the parts are in operative relation.

FIGURE 8 is an elevational longitudinal side view of the structure shown in FIGURE 7 as viewed from the left.

FIGURE 9 is a fractional vertical sectional view on an enlarged scale taken generally on the line 9—9 of FIGURE 3 showing the relation of the gasket assembly to the frame and gate.

FIGURE 10 is a fractional vertical sectional view on an enlarged scale taken generally on the line 10—10 of FIGURE 3 showing the relative position of the gasket assembly with the gate in full open position.

FIGURE 11 is a fractional vertical sectional view on an enlarged scale taken generally on the line 11—11 of FIGURE 3 and showing the relation of the gasket assembly to the frame at the leading end of the hopper opening with the gate not being shown.

In the drawings, 10—10 indicates the wheels of the car and 11—11 the rails on which the car is mounted and 12 indicates the hopper which embodies the improved gasket structure of the invention.

The hopper 12 is adapted for center discharge between the rails and is provided with a discharge opening 13 (FIGURE 3). The hopper 12 includes longitudinally extending downwardly converging side walls 14—14 which meet with transversely extending downwardly converging walls 15—15 to form the four-sided hopper 12. The walls 14 and 15 are spaced apart at their lower marginal edges to form the discharge opening 13 which is adapted to be closed by a sliding gate 16. The gate 16 is slidably mounted in a framing structure 17 which borders the lower portion of the hopper 12.

The framing structure 17 preferably includes longitudinally extending members 18 each having a lower vertical wall section 19 and an upper outwardly sloping section 20, which sections 20 underlie lower portions of the hopper walls 14. The lower margins of the vertical wall sections 19 are flanged outwardly as indicated at 21. The longitudinally extending members 18 join with transversely extending members or end walls 22 and 23 to form a four-sided chute-like enclosure which extends below the level of the gate 16. The end wall 22 in combination with the longitudinally extending side walls 19—19 thus form a three-sided enclosure within which the sliding gate 16 is movable into a closed position. The outwardly sloping upper wall sections 20—20 of the members 18—18 meet with transversely extending inwardly sloping walls 25 and 26 and are united therewith, as by welding. The walls 25 and 26 extend downwardly below the sloping wall sections 20 with such downwardly extending portions being joined with longitudinally extending downwardly sloping shedding wall portions or plates 27—27 to form an inverted truncated-shaped structure, the lower marginal edges 28 of which constitute the boundaries of the discharge opening 13.

The longitudinally extending or side edges of the gate 16, when same is not fully open, extend beneath the marginal edges 28 of the shedding plates 27 and project laterally outwardly therefrom toward the outwardly spaced walls 19—19 of the members 18—18 to form ledges 29. The ledge portions 29 in combination with the downwardly sloping shedding plates 27 and the side walls 19 of the members 18 form triangular-shaped chambers 30, as best seen by reference to FIGURE 9.

The gate 16 extends beyond the end wall 26 and the projecting part is deflected upwardly at 31 and thence forwardly as at 32 to form a Z-shaped end. There are provided on each side of the frame 17 extension rail members 33—33 which are preferably formed of two angle members 34 and 35 disposed in back-to-back inverted relation and united by welding, as best illustrated at 36 and 37 in FIGURE 9, to form a Z-shaped member.

The extension runway assemblies 33 each include an inwardly extending lower flange 38 and an outwardly extending upper flange 39. The assemblies 33 overlap the side walls 19 of the members 18 for an appreciable distance and are united therewith by welding the lower flange 38 thereto, as indicated at 40 in FIGURE 9. The upper part of each assembly 33 adjacent the outwardly extending flange 39 thereof is also connected to one of the members 18 through the medium of a bar filler 41 which is welded to the respective members 18 and 34, as indicated at 42 and 43, respectively, in FIGURE 9.

The projecting end of the gate 16 is fitted with a transversely extending bar member 44 which is welded to the upper surface of the forwardly extending flange 32 of the gate 16, which bar 44 is extended at each end to project laterally beyond the sides of the gate proper to provide extensions 45 which overlie the flanges 38 of the runway extensions 33. As best illustrated in FIGURES 1 and 3, a bearing shoe 46 is welded to the underside of each bar extension 45 and to the adjacent ends of the flanges 32 of the gate 16. The bearing shoes 46 seat on the inwardly extending flanges 38 of the runway assemblies 33 and thus constitute bearing seats for the projecting end of the gate 16 to support the trailing end thereof throughout its movement.

Movement of the gate 16 is effected through the medium of a rotatable shaft 47 which is carried by the gate in bearings 48. The bearings 48 are preferably in the form of U-shaped straps which define open-sided bearings 48 permitting ready insertion or removal of the shaft 47. The shaft 47 is retained in place in the bearings 48 by means of bearing blocks 49 (FIGURES 1 and 5) which are retained in position by bolts 50. Each bearing 48 is braced to the underside of the gate 16 by a bracing gusset plate 51 which is welded to the gate and to the bearing.

As best illustrated in FIGURES 1 and 3, the outer edges 52 of the upper walls of the bearings 48 are disposed in alignment with and adjacent to inner edges 53 of the lower flanges 38 of the runway assemblies 33 and the gate 16 is guided thereby against lateral displacement.

Movement of the gate 16 is effected, in the illustrated form of the invention, by rotation of the shaft 47 and to this end interengaging rack and pinion means indicated at 54 and 55, respectively, are provided. The racks 54 are disposed at the outer sides of the runway assemblies 33 to underlie the outwardly extending flanges 39 of the rail members 34 and the pinion means 55 are nonrotatably mounted on the shaft 47 in axially spaced relationship. Each end of the shaft 47 is fitted with an operating head 56 having a series of openings 57 for the reception of a suitable operating tool (not shown) for rotating same.

The trailing end of the gate 16, when in its closed position, is supported by the bar extensions 45 and the bearing shoes 46 on the flanges 38 of the members 35 and the leading end thereof is supported on a series of supporting brackets 58, which are rigidly mounted on the inner surface of the end wall 22. Upon initial opening movement of the gate 16 and withdrawal of its leading edge from the supporting brackets 58, the support therefor is transferred to an intermediate location on brackets 59 which are rigidly mounted on the inner surfaces of the vertical wall sections 19 of the framing structure members 18, which brackets 59 are located so as to allow slight downward swinging movement of the leading portion of the gate, as is illustrated in FIGURE 5, for a purpose which will be evident hereinafter.

The spaced extension rails or runway assemblies 33 are transversely united by a tie member in the form of an angle-shaped element 60 which is disposed in inverted V-shape relation and welded at 61 (FIGURES 3 and 5) to the outwardly extending flanges 39 of the rail members 34. The hopper end wall 26 is reinforced by a member 62 having angularly related walls indicated at 63 and 64, respectively, with the wall 63 underlying the hopper wall 26 and the other wall 64 extending outwardly from the frame structure 17 to overlie the projecting end of the gate 16 when it is in its fully closed position.

The discharge opening 13 is bordered by a resilient gasket structure 65 which, as best illustrated in FIGURES 7 and 8, is made up of two components including a three-sided U-shaped unit 66 and a transversely extending component 67. The three-sided component 66 includes a transversely extending piece 68 and side arm pieces 69—69 extending generally normally from the respective ends of the transversal piece 68. The three-sided component 66 is formed of a length of resilient tubular-shaped outer gasketing material 66a (FIGURE 6) and an inner framing rod 70 which extends therethrough, which structure is then bent as a unit to provide the finished generally U-shaped gasket component 66. The framing rod 70 extends beyond the ends of the outer tubular part 66a to present extensions 71 which are screwthreaded at 72 for receiving complementary screwthreaded nuts 73. The rod extensions 71 extend through apertures 74 formed in the end wall 22 of the enclosure and form the sole retaining means for the gasket component 66 thereby allowing the side arms 69—69 to have a downward swinging movement about the distal ends of the arms and biasing the transversal piece 68 into seating engagement with the upper surface of the gate 16.

The side arms 69—69 of the component 66 previously described are housed within the triangular-shaped chambers 30 and are compressed between the inner surfaces of the chambers and the upper surface of the gate 16 at the side edges thereof when the gate swings upwardly during its closing movement when the support therefor is shifted from the intermediate supports 59 to the slightly raised end supporting brackets 58.

The sealing of the fourth side of the discharge opening 13 is carried out by means of the transversely extending gasket component 67 which is disposed in generally horizontally aligned relationship with the leading edge 45a of the gate 16, which edge may be beveled, as indicated in FIGURE 10.

The gasket component 67 in like manner to the gasket component 66 includes a length of tubular-shaped, resilient gasketing material 67a having a rod 75 extending therethrough and having screwthreaded extensions 76 extending through apertures 77 (FIGURE 4) in the side walls 19 of the frame structure 17. The rod 75 is retained in place by screwthreaded nuts 78 applied to the projecting screwthreaded extensions 76. The component 67 as will be seen by reference to FIGURES 7, 8 and 11 extends beneath the side arms 69—69 of the component 66 intersecting the same in impinging relation thereby providing for effective sealing completely around the discharge opening 13. The gasket component 67 is thus supported at each end by the rod 75 and intermediate its ends it rests in pockets 79 formed by an inclined portion 80 of the end wall 22 and inclined surface portions 81 of the end supporting brackets 58, as best illustrated in FIGURE 11. The gasket component 67 is retained in the pockets 79 by a series of brackets 58a (FIGURES 3, 4 and 11) which are rigidly mounted on the inner surface of the end wall 22 for engagement with the uppermost surface portion of the gasket component 67.

The transversal piece 68 of the gasket component 66, which is movable downwardly to seat on the upper surface of the gate 16, is retained by the gate in an inverted V-shaped recess, best illustrated in FIGURE 10, which is defined by the outer surface 26a of the wall 26 and by an angularly related surface 82 of an abutting member 83 which in turn is welded to the wall 63, as at 84. The transversal piece 68 of the gasket component 66 in addition to its primary function as a gasket also operates as a sweeper to clean off residual lading which would ordinarily be carried along on the gate 16 as same is opened. The gate 16 is therefore self-cleaning. In practice it has been found that there is a tendency for the resilient part 66a of the gasket component 66 to stretch during the bending operation and such elongation is restored by abutting its distal ends 85 against the end wall 22, as in FIGURE 11, and compressing the longitudinally extending gasket sections 69—69 by means of the nuts 73 which are adjustably mounted on the threaded ends 72 of the rod 70.

The outer generally tubular portions 66a and 67a of the gasket components 66 and 67, respectively, may be formed of any suitable material having a necessary degree of resiliency or compressibility for service as a gasket member, such materials including rubber or other rubber-like materials, plastic materials having such characteristics, and nylon pile carpet-like materials. The inner rod members may either extend loosely through the outer tubular portions of the gasket components or the tubular portions may be bonded to the rod members in a suitable manner.

The gate 16 is retained in its closed position against the gasket component 67 by means of a locking dog 86 having a cam edge 86a, which dog is sandwiched between a pair of walls 87—87 and is pivotally connected thereto by a pin 88 to swing downwardly during opening movement of the gate. The walls 87—87 extend between the tie member 60 and the frame structure 17, being welded thereto in an appropriate manner. The dog 86 and the supporting walls 87 are provided with apertures 91 and 92, respectively, which are adapted to be aligned when the dog 86 is in its operative locking position for the accommodation of a seal (not shown) of a well-known type.

The dog 86 includes laterally extending lugs 93—93 which seat on the walls 87, when the dog is in its gate-latching position, and limit further downward swinging movement of the dog in a latching direction. In its released position, the dog 86 is swung upwardly to an overbalanced position to rest against the tie member 60, as indicated in conventional broken lines in FIGURE 2.

It will be noted by reference to FIGURE 11 that the spacing between the bearing surfaces of the brackets 58 and both the brackets 58a and the marginal edge of the sloping end wall 25, as indicated at 94, is narrow and would not normally accommodate insertion of the gasket component 67 therebetween. In the present embodiment this difficulty is overcome by first compressing and inserting the gasket 67a and thereafter inserting the rod 75 through the gasket 67a and the side walls 19.

In operation, assuming the gate 16 to be in its open position as after discharging material from the hopper 12, the gate 16 may be slidably closed by rotating the shaft 47 by means of a suitable tool engaged with one of the operating heads 56 thereon. When the gate 16 is in its fully closed position, as illustrated in FIGURE 2, the leading edge 45a thereof is disposed in abutting engagement with the gasket component 67 whereby to compress same and provide an effective seal at the corresponding transverse edge of the discharge opening 13. The remaining three sides of the discharge opening 13 are effectively sealed by the U-shaped gasket component 66 as a result of the side arm pieces 69 thereof being in compressed sealing engagement with the upper surface of the gate 16 along the longitudinally extending side edges thereof and the transversal piece 68 thereof being in compressed sealing engagement with the upper surface of the gate 16 near the trailing edge thereof.

When the gate 16 is to be moved into its closed position, the locking dog 86 is swung downwardly from its unbalanced release position against the tie member 60 until the cam edge 86a thereof is in contacting engagement with the trailing edge of the gate 16. Thus, during the latter portion of the closing movement of the gate 16, the locking dog 86 swings downwardly with the lugs 93 thereon seating themselves on the upper edges of the walls 87 simultaneously as the leading edge 45a of the gate 16 moves into compressible engagement with the gasket component 67, whereby to provide automatic latching of the gate 16 in its fully closed position. A suitable seal or locking pin may then be inserted through the aligned openings or apertures 91 and 92 which are provided in the dog 86 and the walls 87, respectively.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a hopper having a discharge opening, in combination, a frame structure bordering the discharge opening, a sliding gate for the opening supported on said frame structure, a U-shaped gasket structure overlying three side edges of said gate in contacting engagement therewith when the gate is in its position closing said discharge opening, said U-shaped gasket structure having its central portion extending transversely to the path of sliding movement of the gate and having its arm portions extending generally normally from the ends of said transversal central portion and terminating in distal ends, and means connecting said distal ends of said arm portions of said gasket structure to said frame structure whereby to confine movement of said gasket structure to a swinging action about said connected distal ends thereof with said transversely extending central portion of said gasket being supported on the upper surface of said gate throughout the entire range of movement of said gate relative thereto.

2. The improvement set forth in claim 1 wherein the gasket structure comprises an elongated outer tubular compressible shell and an elongated rod of lesser diameter than the inner diameter of the shell extending therethrough and having a greater length whereby the ends of said rod extend beyond the ends of said outer shell and through openings in said frame structure, and said rod extensions being screwthreaded and having complementary nuts tightened thereon externally of said frame structure.

3. In combination, a hopper having a discharge opening, a frame structure bordering the discharge opening and characterized by inwardly converging side and end walls defining an inverted truncate-like structure, a three-sided enclosure including side walls and an end wall spaced outwardly from the inner marginal edges of said converging walls of said frame structure, a sliding gate for the discharge opening movable into a closed position within the three-sided enclosure and underlying the converging walls of said frame structure, said gate being extended laterally outwardly beyond the lower edges of said converging side walls to form triangular-shaped chambers in combination with said enclosure side walls and said converging frame structure side walls, an elongated U-shaped tubular gasket extending around three sides of said converging frame structure walls and in contacting engagement with the upper surface of said gate when same is in its closed position, said gasket being characterized by a centrally disposed portion which extends transversely of the path of movement of said gate and which is in contact with the upper surface of said gate throughout its entire range of movement and by arm portions which extend generally normally from the opposite ends of said central portion and pass through said triangular-shaped chambers for contacting engagement with the upper surfaces of said lateral extensions of said gate and with the ends of said arm portions contacting said enclosure end wall, and a U-shaped rod extending through said tubular gasket and having its opposite ends anchored in said enclosure end wall.

4. In combination, a hopper having a discharge opening at its lower end, a sliding gate for the opening, a three-sided enclosure at the lower end of said hopper and rigid therewith including side walls and an end wall adapted to embrace said gate when same is in its closed position, inwardly converging walls leading from the inner upper portions of said enclosure walls for directing lading in the hopper to the discharge opening, said gate being laterally extended beneath certain of said converging walls to form therewith and with said enclosure side walls triangular-shaped chambers disposed outwardly of and extending generally parallel to the side edges of said discharge opening when said gate is in its closed position, a U-shaped tubular gasket structure interposed between the upper surface of said gate and the undersurfaces of said converging walls, said gasket structure being characterized by spaced arm portions extending within said triangular-shaped chambers and by a transversely extending portion between said arm portions which is seated on the upper surface of the gate throughout its entire range of longitudinal movement, said arm portions having their distal ends abutting against said enclosure end wall, and means for axially compressing said tubular gasket structure comprising, a framing rod extending therethrough with its ends extending beyond the ends of said gasket and through said enclosure end wall, said rod extensions being screwthreaded, and complementary screwthreaded nuts adjustable on said rod ends.

References Cited by the Examiner

UNITED STATES PATENTS

| | | | |
|---|---|---|---|
| 868,076 | 10/1907 | Cross | 220—46 |
| 1,484,764 | 2/1924 | Dodd | 105—272 |
| 2,386,702 | 10/1945 | McBride | 105—282 |
| 2,661,182 | 12/1953 | Kipp | 251—76 |
| 2,738,737 | 3/1956 | Zimmer | 105—282 |

FOREIGN PATENTS 312,421   5/1929   Great Britain.

ARTHUR L. LA POINT, *Primary Examiner.*

LEO QUACKENBUSH, MILTON BUCHLER,
*Examiners.*

H. BELTRAN, *Assistant Examiner.*